Patented Mar. 19, 1935

1,994,619

UNITED STATES PATENT OFFICE 1,994,619

MANUFACTURE OF RUBBER AND LIKE MATERIALS

Benjamin Dawson Porritt, Thomas Rayner Dawson and John Richard Scott, Croydon, England, assignors to The Research Association of British Rubber Manufacturers, Croydon, England No Drawing. Application January 10, 1933, Serial No. 651,056. In Great Britain January 12, 1932

2 Claims. (Cl. 106—23)

This invention relates to petrol and oil hose, packings, valves, and like oil-resisting rubber articles, and to improvements in the manufacture thereof.

It is well known that when vulcanized rubber or a like material is brought into contact with certain liquids such for example as hydrocarbons, halogen substitution products of hydrocarbons, or other hydrocarbon derivatives which are not markedly polar or with the vapors of these liquids the rubber or like material swells by absorbing the liquid and when the swollen material is subjected to deformation it breaks much more easily than in its original unswollen condition.

Vulcanized rubber and like materials are used in making petrol hose, oil hose, packings and jointings, valves, rubber-covered cables and rollers, belting and many other articles which come into contact with liquids of the above-mentioned types (hereinafter referred to as "swelling liquids") or with the vapors of such liquids, and as the poor mechanical properties resulting from the action of the swelling liquid or vapor may lead to failure of the rubber or the like during use, this susceptibility to the action of swelling liquids or vapors is a serious disadvantage of vulcanized rubber and like materials.

It is well known also that the swelling produced by a swelling liquid or vapor can be reduced by making the vulcanized rubber or like material stiffer and harder, and consequently where such a material is required to withstand the action of swelling liquids and/or vapors it is usually made very stiff and hard so as to reduce the swelling and its attendant harmful effect on the mechanical properties. This procedure has the disadvantage that the characteristic and useful qualities of vulcanized rubber and like materials viz: extensibility and flexibility, are to a great extent annulled, and the use of those types of vulcanized rubber or the like that are resistant to swelling liquids and vapors has therefore been limited to applications where little extensibility and flexibility are required.

When a compounding ingredient is incorporated with rubber by the usual method of dry mixing it is dispersed through the rubber substantially in the form of isolated particles which would not be expected to be very effective in maintaining the strength of the rubber when it is swollen by a swelling liquid. If a flexible water-soluble material substantially unaffected by swelling liquids of the kind mentioned, for instance a protein, is incorporated with rubber by preparing an aqueous dispersion of rubber having the said material dissolved in the aqueous phase and thereafter removing substantially the whole of the water from the dispersion and vulcanizing the resulting product, it may be expected that the flexible material will be reticulate or form a continuous network throughout the mass and that such a network will be much more effective than isolated particles in conferring strength on the mass when the rubber phase is weakened by the action of a swelling liquid. We have found that vulcanized rubbers containing a water-soluble protein introduced by the method just described do retain their strength, when subjected to a swelling liquid, better than vulcanized rubbers containing ingredients introduced by dry mixing.

In accordance with the present invention petrol and oil hose, packings, valves, and like oil-resisting rubber goods are rendered less liable to failure, caused by the breakage of the rubber when swollen by liquids such as those aforementioned or by the vapors of such liquids, by the inclusion in the rubber composition of glue, gelatin, or other water-soluble protein introduced by a method comprising the following steps:— (i) Preparing by any suitable method an aqueous dispersion of rubber or the like, said dispersion containing the glue, gelatin, or other protein dissolved in the aqueous phase and the rubber and glue being in the proportions of about 3:1 by weight, (ii) removing substantially the whole of the water from said dispersion by spray drying, (iii) mixing the material so obtained with rubber and, if desired, a filler, and (iiii) subjecting the mixture so obtained to vulcanization by any suitable process. Vulcanized products obtained by this method do not break so readily when subjected to deformation after being swollen by a swelling liquid or vapor as do other vulcanized products which possess substantially the same extensibility and flexibility in the unswollen state but which do not contain glue, gelatin, or other water-soluble protein introduced in the above-described manner. Articles made wholly or partly of vulcanized rubber prepared in the above-described manner are therefore better adapted to withstand the action of swelling liquids and/or vapors than are articles made of the vulcanized rubbers and like materials at present used.

Oil-resisting articles of rubber etc. containing glue or the like, in accordance with the present invention, have a further advantage over those in which the action of swelling liquids and/or vapors on the rubber has been lessened by incorporating therein materials consisting of crystalline or flaky particles, for example, magnesium carbonate, ground barytes, and china clay, namely, that rubbers made according to the invention, when swollen, show no tendency to tear easily in one direction, whereas rubbers containing materials of the kind mentioned often tear very easily in one direction owing to orientation of the particles during the mechanical processing of the unvulcanized rubber mixture.

It will be understood that the mention of petrol and oil hose, packings, and valves is not to be considered as restricting the invention to these articles, as the invention may be applied to any article of rubber or the like which is required to withstand the action of swelling liquids and/or vapors.

By the expression "aqueous dispersion of rubber or the like" is to be understood any natural or artificial aqueous dispersion of natural, synthetic, or reclaimed rubber or any mixture of these; the dispersion may be concentrated and may contain preservatives, anticoagulants, and the like. Fillers, pigments, vulcanizing agents, accelerators, antioxidants, softeners, and the like may be incorporated by any suitable method before, during, or after the preparation of the dispersion or after removing the water therefrom.

The following example will illustate the utility of the invention:—

Rubber latex containing an anticoagulant is mixed with an aqueous solution of glue so as to give a mixture containing rubber and glue in the proportions of 3:1 by weight. Substantially the whole of the water is then removed from the mixture by the known method of spray-drying or in any other appropriate manner. Eighty parts by weight of the resulting solid are mixed on a roll mill with 16 parts of rubber and 4 parts of sulphur, and the mixture is vulcanized in the normal manner, for example, for 75 minutes at a temperature of 153° C. The vulcanized product, after being swollen in benzene, is much less readily broken than are vulcanized products which have similar extensibility and flexibility in the unswollen state but contain only inorganic fillers such for example as zinc oxide, magnesium carbonate, litharge, whiting, barytes, or carbon black, or glue introduced by the usual dry mixing on a roll mill and which have been similarly swollen in benzene. The superiority of the vulcanized product made as described herein is not due to its containing all the solid constituents of the latex, because the use of "whole-latex" rubber, that is, raw rubber containing all these constituents, in preparing the rubbers containing inorganic fillers or glue introduced by dry mixing does not confer this superiority upon such rubbers.

It will be understood that the example given is not to be considered in any sense as restricting the invention, as variations in the nature and proportons of the constituents and in the method of procedure may be made as found in practice desirable without departure from the invention.

What we claim is:—

1. Oil-resisting rubber articles required to resist mechanical failure under the action of liquids that swell vulcanized rubber, including a rubber composition obtained by preparing an aqueous dispersion of rubber with a protein dissolved in the aqueous phase, removing substantially the whole of the water from said dispersion, mixing the material so obtained with rubber in a roll mill and vulcanizing the mixture.

2. Oil-resisting rubber articles required to resist mechanical failure under the action of liquids that swell vulcanized rubber, including a rubber composition obtained by preparing an aqueous dispersion of rubber and glue in the proportions of 3:1 by weight, removing substantially the whole of the water from said dispersion by spray drying, adding 80 parts of the resulting dry material to 16 parts of rubber and 4 parts of sulphur, mixing in a roll mill and vulcanizing the mixture.

BENJAMIN DAWSON PORRITT.
THOMAS RAYNER DAWSON.
JOHN RICHARD SCOTT.